(12) United States Patent
Voiles et al.

(10) Patent No.: US 7,763,205 B2
(45) Date of Patent: Jul. 27, 2010

(54) CONTINUOUS PROCESS FOR FABRICATING REACTION BONDED SILICON NITRIDE ARTICLES

(75) Inventors: Edwin Todd Voiles, Lexington, KY (US); Bijana Mikijelj, Cerritos, CA (US)

(73) Assignee: Ceradyne, Inc., Costa Mesa, CA (US)

( * ) Notice: Subject to any disclaimer, the term of this patent is extended or adjusted under 35 U.S.C. 154(b) by 88 days.

(21) Appl. No.: 10/971,996

(22) Filed: Oct. 22, 2004

(65) Prior Publication Data

US 2006/0087060 A1   Apr. 27, 2006

(51) Int. Cl.
  *C04B 64/35*  (2006.01)
  *C04B 33/00*  (2006.01)
(52) U.S. Cl. .................. 264/683; 264/652; 264/653; 264/676; 264/646
(58) Field of Classification Search .................. 264/656, 264/646, 676, 681, 652, 653, 647, 659, 683; 423/344
See application file for complete search history.

(56) References Cited

U.S. PATENT DOCUMENTS

| | | | |
|---|---|---|---|
| 4,235,857 A | | 11/1980 | Mangels |
| 4,331,772 A | * | 5/1982 | Torre et al. .................. 501/97.2 |
| 4,848,984 A | | 7/1989 | Ezis et al. |
| 4,946,630 A | | 8/1990 | Ezis |
| 4,970,057 A | * | 11/1990 | Willkens et al. ............. 423/344 |
| 5,187,129 A | * | 2/1993 | Edler et al. .................. 501/97.1 |
| 5,989,363 A | * | 11/1999 | Georges ..................... 148/222 |
| 5,998,319 A | * | 12/1999 | Hintermayer ............... 501/97.1 |
| 6,197,243 B1 | * | 3/2001 | Tiegs et al. .................. 264/432 |

* cited by examiner

*Primary Examiner*—Carlos Lopez
(74) *Attorney, Agent, or Firm*—Leonard Techner

(57) ABSTRACT

Method of fabricating RBSN parts in which the processing of compacts of silicon to produce reaction bonded silicon nitride products is accomplished in a continuous style furnace. The furnace of the preferred embodiment is arranged as a contiguous series of furnace sections or zones configured to have a part conveyor traveling slowly from one end to another to sequentially expose the parts to each zone. Each zone may for example be one foot long. The conveyor then travels at a rate of one foot per hour. Parts to be nitrided are settered onto kiln furniture plates while providing a minimum one-quarter inch clearance to all other parts. The parts on the plates are conveyed through the sequential temperature zones in a continuous fashion while under ambient pressure flowing nitrogen gas. The parts travel through the contiguous temperature zones at a constant rate of conveyance allowing the nitriding reaction to progress to completion.

26 Claims, 3 Drawing Sheets

Green compact part made from Si and other additives

↓

Reaction bonding ramping temperature to 1400 C, Nitrogen, 29 hours

↓

Cool part to room temperature, 12 hours

Boats loaded with parts

| Zone | Temp ('C) | Time (hr)/Ft |
|---|---|---|
| Unheated | 50 | 1 |
| Unheated | 100 | 2 |
| Unheated | 200 | 3 |
| Unheated | 300 | 4 |
| Preheat1 | 400 | 5 |
| Preheat2 | 600 | 6 |
| Preheat3 | 800 | 7 |
| Preheat4 | 1000 | 8 |
| | 1017 | 9 |
| | 1034 | 10 |
| High Heat 1 | 1050 | 11 |
| | 1075 | 12 |
| High Heat 2 | 1100 | 13 |
| | 1150 | 14 |
| High Heat 3 | 1200 | 15 |
| | 1250 | 16 |
| High Heat 4 | 1300 | 17 |
| | 1325 | 18 |
| High Heat 5 | 1350 | 19 |
| | 1375 | 20 |
| High Heat 6 | 1400 | 21 |
| | 1400 | 22 |
| High Heat 7 | 1400 | 23 |
| | 1400 | 24 |
| High Heat 8 | 1400 | 25 |
| | 1200 | 26 |
| High Heat 9 | 1000 | 27 |
| | 900 | 28 |
| | 800 | 29 |
| Cool 1 | 700 | 30 |
| | 600 | 31 |
| | 500 | 32 |
| | 400 | 33 |
| Cool 2 | 350 | 34 |
| | 300 | 35 |
| | 250 | 36 |
| | 200 | 37 |
| Cool 3 | 175 | 38 |
| | 150 | 39 |
| | 100 | 40 |
| Exit | 75 | 41 |

Entrance

Exit

Direction of Travel, 1ft/hr continuous

FIG. 2

CONTINUOUS PROCESS FOR FABRICATING REACTION BONDED SILICON NITRIDE ARTICLES

BACKGROUND OF THE INVENTION

1. Field of the Invention

The present invention relates generally to the field of reaction bonded silicon nitride (RBSN) and more specifically to a continuous process for manufacturing articles made of RBSN.

2. Background Art

RBSN is conventionally made by heating a compact of silicon powder in a nitrogen gas atmosphere. Typically, the nitriding cycle is carried out at a temperature of about 1400° C. and can take up to two hundred hours or longer. Reaction bonding enables the production of complex near net shapes. Although silicon expands by about 20% on conversion to nitride, the expansion is accommodated by the initially void space of the silicon compact. Consequently, there is very little change in the volume of the articles. As a result, relatively accurate shapes and dimensions can be achieved while obviating expensive finishing tasks such as diamond grinding and the like. To the extent that the nitrided article needs further densification or shaping, hot pressing may be used to achieve the desired result. An example of prior art methods for producing RBSN articles may be obtained in issued U.S. Pat. Nos. 4,235,857 to Mangels; 4,848,984 to Ezis et al; and 4,946,630 to Ezis, all of which are assigned to the assignee hereof and each of which disclosure is incorporated herein by reference.

Conventional prior art RBSN fabrication processes have various disadvantages which are addressed by the present invention. First and foremost among these disadvantages is the processing time required to produce finished parts. Usually, the most significant part of the overall processing time is the number of hours required for the nitriding process. As mentioned above, this number is typically as much as 200 or more hours when starting with a green compact part.

Another concern associated with conventional RBSN processing is thermal runaway. As Si reacts with $N_2$ and becomes $Si_3N_4$, waste heat is generated within the furnace. This heat is radiated to other nearby parts, which prompts more reaction, which generates more heat, which makes the reaction speed up. Such thermal runaway can create a temperature that is sufficiently high to melt the silicon which becomes resistant to nitriding thereby compromising the resulting material. This problem is exacerbated when the parts are crowded together within the furnace where the radiated heat of each part's reaction can reach and affect nearby parts.

Still another concern is the total amount of energy that is required to nitride the silicon compacts over a long period of time at high temperatures. Running a nitriding furnace is an expensive use of electrical energy, particularly at today's high cost of electricity. It takes about 21,000 Kwh to run a conventional nitriding furnace per batch of product. At current rates of about 14 cents/Kwh, each such furnace costs almost $3,000 in energy alone to run one batch of product.

Yet another concern is cost of maintenance. The constant temperature cycling of each furnace and the exposure to air during loading and unloading of each product batch, requires frequent and costly maintenance that is labor intensive and interrupts part production.

Therefore, it would be highly advantageous if it were possible to reduce processing time, eliminate thermal runaway, reduce energy costs and maintenance in the fabrication of RBSN parts.

SUMMARY OF THE INVENTION

The present invention provides all of the aforementioned advantages. It comprises a new method of fabricating RBSN parts in which the processing of compacts of silicon to produce reaction bonded silicon nitride products is accomplished in a continuous style furnace. The result is a substantial reduction in processing time, elimination of thermal runaway problems, reduction of energy required per pound of product and a reduction in maintenance by elimination of cycling hot zone parts and frequent exposure to air.

The novel furnace of the preferred embodiment is arranged as a contiguous series of furnace sections or zones configured to have a part conveyor traveling slowly from one end to another to sequentially expose the parts to each zone. Each zone may for example be one foot long. The conveyor then travels at a rate of one foot per hour. Parts to be nitrided are settered onto kiln furniture plates while providing a minimum one-quarter inch clearance to all other parts. The parts on the plates are conveyed through the sequential temperature zones in a continuous fashion while under ambient pressure flowing nitrogen gas. The parts travel through the contiguous temperature zones at a constant rate of conveyance allowing the nitriding reaction to progress to completion. Thermal runaway problems are avoided due to the low cross-section of parts allowed to radiate to one another. Each furnace zone is kept at a constant temperature thereby avoiding problems associated with prior art cycling of furnace temperatures. The processing time for the nitriding to be completed is cut to 41 hours which is at least a 75% reduction as compared to conventional batch nitriding processes. Energy usage is reduced by a significant amount as well. In a preferred embodiment of the invention, energy required to nitride the same number of identical parts was reduced by at least 20%.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIG. 2 is a conceptual layout illustration of the preferred embodiment showing the sequence of furnace temperature zones and their respective temperatures.

DETAILED DESCRIPTION OF A PREFERRED EMBODIMENT

Figure 1:
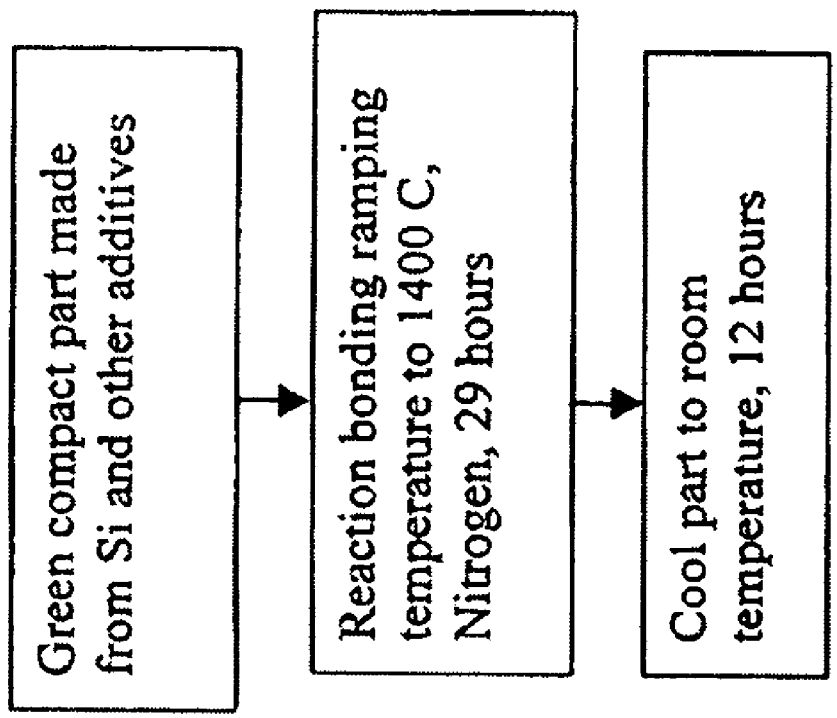
FIG. 1 is a simplified flow diagram of the process of the preferred embodiment.

The method of the present invention is exemplified by the preferred embodiment illustrated in FIG. 1. It will be understood that the times and temperatures shown therein are subject to variation depending upon the specific material characteristics of the articles to be nitrided such as the nature and relative quantities of silicon and additives as well as the desired characteristics of the reaction bonded silicon nitride articles achieved upon completion of the nitriding process. Accordingly, the specified times and temperatures are disclosed herein by way of illustration to explain the method of the invention, but without restricting the scope hereof.

Referring to FIG. 1, it will be seen that a green compact, which may be made according to the teaching of relevant prior art such as in the aforementioned issued U.S. Patents and numerous other such disclosures, is prepared from silicon and other additives. The green compact article is then subjected to reaction bonding by ramping up the temperature to about 1400° C. in a flowing pressured nitrogen gas environment. This temperature ramping is carried out gradually over an extended period of time (i.e., at least 20 hours) including at least five additional hours at the highest temperature. The part is then gradually cooled to room temperature which may take on the order of twelve hours.

Figure 3:
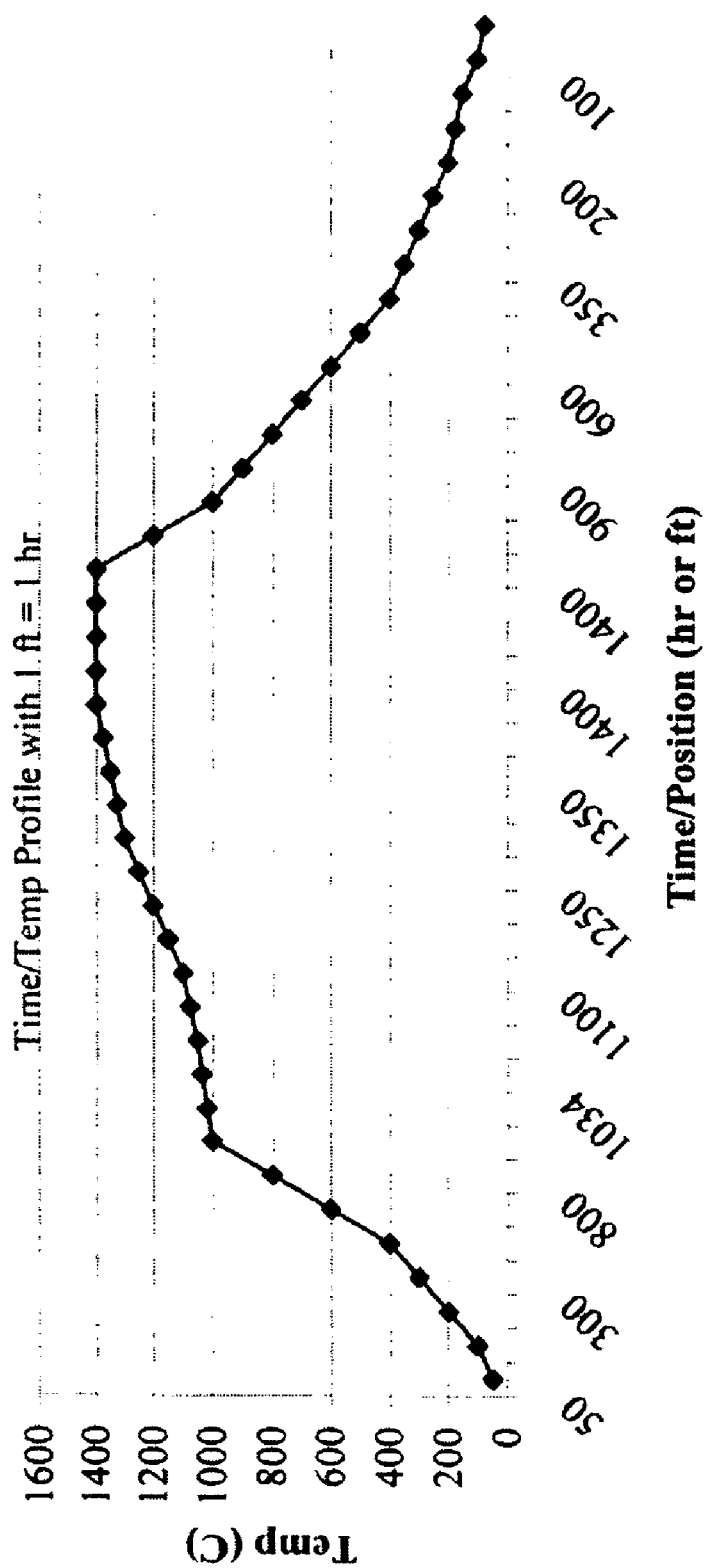
FIG. 3 is a graph of temperature versus time that each part experiences while traveling through the sequence of furnace zones of FIG. 2.

FIG. 2 illustrates the novel manner in which these heating and cooling steps are carried out in the preferred embodiment. The parts or articles are preferably settered into kiln furniture consisting of well-known plates or boats. These plates or boats are then placed on a conveyor traveling at a selected rate such as one foot per hour. The conveyor transports the articles into a contiguous series of furnace zones, a juxtaposed serial array of furnaces each set to operate at a selected temperature and each having a selected nitrogen gas environment. The specific series of furnace zones of the preferred embodiment and the selected temperature of each such zone is illustrated in FIG. 2. As shown therein, zones 5 through 8 are used for preheating, zones 11 through 27 are used for applying high heat and zones 30 through 38 are used for cooling. The zones shown in FIG. 2 and the rate of travel therethrough are selected to heat articles at about 1400° C. for at least five hours during a period of about twelve hours. In the illustrated embodiment, each zone is a foot long and the conveyor travels at about one foot per hour so that the parts are subjected to the heat of each furnace for about one hour. Of course, it will be readily apparent that the zones may be longer or shorter with an attendant modification of the rate of travel. Alternatively, the zones may be of different lengths particularly where the temperature remains constant from zone to zone. For example, zones 21 through 25 of FIG. 2 could alternatively be replaced by a smaller number of longer zones including one zone five feet long or two zones of two and one-half feet length each or two zones, one of two feet length and one of three feet length, etc. as long as the desired temperature/time profile is achieved. One such profile is illustrated in FIG. 3 by way of example.

Having thus disclosed a preferred embodiment of the present invention, it being understood that the scope hereof is limited only by the appended claims and their equivalents,

What is claimed is:

1. A process for nitriding in the fabrication of reaction bonded silicon nitride articles; the process comprising the steps of:
fabricating a green compact from silicon and additives into respective article shapes;
settering said articles into kiln furniture plates;
providing a contiguous series of furnace zones, each such zone being set at a selected temperature and having a selected flow of pressured nitrogen gas;
conveying said articles in said kiln furniture plates continuously through said zones at a selected rate of travel to achieve nitriding thereof.

2. The process recited in claim 1 wherein each said zone is about one foot long and said rate of travel is about one foot per hour.

3. The process recited in claim 1 wherein a first plurality of said zones is used for preheating said articles.

4. The process recited in claim 3 wherein a second plurality of said zones is used for applying high heat to said articles.

5. The process recited in claim 4 wherein a third plurality of said zones is used for cooling said articles.

6. The process recited in claim 1 wherein said series of furnace zones are configured for first pre-heating said articles, then applying high heat to said articles, then allowing said articles to cool.

7. The process recited in claim 1 wherein said selected rate of travel is constant.

8. The process recited in claim 1 said zones are configured for heating said articles up to a temperature of about 1400° C.

9. The process recited in claim 8 wherein said zones and said rate of travel are selected to heat said articles up to about 1400° C. over a period of time of at least 20 hours.

10. The process recited in claim 8 wherein said zones and said rate of travel are selected to heat said articles at about 1400° C. for a period of at least 5 hours.

11. The process recited in claim 8 wherein said zones and said rate of travel are selected to allow said articles to cool to less than about 100° C. over a period of at least 12 hours.

12. The process recited in claim 1 wherein said zones and said rate of travel are selected to heat said articles at a substantially constant temperature for at least one hour in each said zone.

13. The process recited in claim 1 wherein said articles with each said plate are at least ¼ inch apart.

14. A method for nitriding for fabrication of reaction bonded silicon nitride articles; the method comprising the steps of:
fabricating green compacts of said articles made predominantly from silicon;
providing a juxtaposed serial array of furnace zones, each said zone having a selected temperature and a flow of nitrogen gas; and
conveying said green compacts of said articles continuously through said zones at a selected rate of travel.

15. The method recited in claim 14 wherein each said zone is about one foot long and said rate of travel is about one foot per hour.

16. The method recited in claim 14 wherein a first plurality of said zones is used for preheating said articles.

17. The method recited in claim 16 wherein a second plurality of said zones is used for applying high heat to said articles.

18. The method recited in claim 17 wherein a third plurality of said zones is used for cooling said articles.

19. The method recited in claim 14 wherein said series of furnace zones are configured for first pre-heating said articles, then applying high heat to said articles, then allowing said articles to cool.

20. The method recited in claim 14 wherein said selected rate of travel is constant.

21. The method recited in claim 14 said zones are configured for heating said articles up to a temperature of about 1400° C.

22. The method recited in claim 14 wherein said zones and said rate of travel are selected to heat said articles up to about 1400° C. over a period of time of at least 20 hours.

23. The method recited in claim 21 wherein said zones and said rate of travel are selected to heat said articles at about 1400° C. for a period of at least 5 hours.

24. The method recited in claim 21 wherein said zones and said rate of travel are selected to allow said articles to cool to less than about 100° C. over a period of at least 12 hours.

25. The method recited in claim 14 wherein said zones and said rate of travel are selected to heat said articles at a substantially constant temperature for at least one hour in each said zone.

26. The method recited in claim 14 further comprising the step of settering said green compact articles in kiln furniture plates before said conveying step.

* * * * *